United States Patent Office 3,753,954
Patented Aug. 21, 1973

1

3,753,954
NOVEL COPOLYMERS AND PROCESS
FOR THEIR PRODUCTION
Masahiko Ohmori, Iwakuni, Tosiharu Tomatu, Otake, and Tadao Iwata, and Juntaro Sasaki, Iwakuni, Japan, assignors to Mitsui Petrochemical Industries, Ltd., Tokyo, Japan
No Drawing. Filed Aug. 2, 1971, Ser. No. 168,485
Claims priority, application Japan, Aug. 3, 1970, 45/67,918, 45/67,919
Int. Cl. C08f 27/00
U.S. Cl. 260—78.4 D      16 Claims

ABSTRACT OF THE DISCLOSURE

An olefin or vinylalcohol copolymer having a repeating unit of the formula

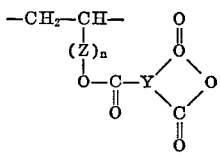

wherein Z is an alkylene group, arylene group or cycloalkylene group or a divalent hydrocarbon group of 1 to 20 carbon atoms consisting of a combination of these groups; $n$ is 0 or 1; and Y is an aromatic hydrocarbon group, the two carbonyl groups being bonded to two adjacent carbon atoms of the aromatic hydrocarbon group or to two carbon atoms in peri-position to each other, and a process for the production thereof.

---

This invention relates to a novel copolymer having excellent properties such as adhesiveness, dyeability, or printability, and to a process for its production. The invention also relates to an olefin polymer composition containing such novel copolymer.

Hydroxyl-containing olefin polymers, polyvinyl alcohols or polyvinyl acetals are difficult to dye vividly. Various improvements have been attempted, but none have been found satisfactory in improving dyeability of these polymers.

For example, polyvinyl alcohol or polyvinyl acetal is treated with a specific aldehyde such as aminoaldehyde in order to remove such defects, but this method has not proved satisfactory. Olefin polymers such as polyethylene, polypropylene, poly-butene, or poly-4-methyl-1-pentene have a number of excellent properties, but on the other hand, their products are difficult to bond by an ordinary bonding method because of the absence of any polar group in their molecular structure. It is also very difficult to dye these polymers to deep fast colors. Therefore, the utilization of these polymers in the fields which require bonding or dyeing is very restricted, and extensive research is being done to develop a procedure to impart these properties.

Particularly, research has been conducted on the introduction of acid anhydride units into olefin polymers. The introduction is effected as disclosed, for instance, in Japanese patent publications Nos. 10,757/67 and 15,422/69 by grafting maleic anhydride to the polymers using a radical catalyst. In spite of the fact that the decomposition of an olefin polymer occurs primarily by radical reaction, all of these prior methods depend on the use of radical-generating agents. This more or less results in the cutting of the molecules of the polymer, and it is difficult to avoid a deterioration in the quality of the olefin polymer. Moreover, the amount of acid anhydride units introduced into the olefin polymer by these methods is at most 1.0 mole percent (0.2 millimoles/g.-polymer).

In an attempt to improve the dyeability of polyolefins, a method has been practised in which the polyolefin is copolymerized with an unsaturated compound having a polar group to thereby introduce a polar group into the polyolefin. But this method encounters difficulties with respect to copolymerizability, and the dyeability of the resulting polymer is not sufficient.

With a copolymer of an olefin with an ethylenically unsaturated monomer having a polar group such as an acid anhydride group, the polar group in the copolymer tends to decompose at the time of melt-shaping, and therefore, articles fabricated from the copolymer are not improved as intended in adhesiveness, dyeability, or printability. Where a polar group is introduced by a prefabricated olefin polymer by graft-copolymerization for example, the above-mentioned defects may be removed, but this method requires high cost and complicated operation.

An object of the present invention is to provide a novel copolymer which has an aromatic acid anhydride unit in the side-chains of the polymer and as a result, has excellent properties such as adhesiveness, dyeability, or printability.

Another object of the present invention is to provide a copolymer, especially an olefin copolymer, in which the acid anhydride group introduced into the polymer chain is an aromatic acid anhydride group, and as a result, the acid anhydride group is maintained relatively stable even at high temperatures or under molten conditions.

According to the present invention, a copolymer is provided composed of:
(A) a repeating unit of the formula

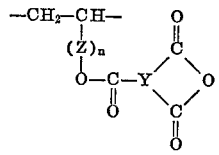

(A)

wherein Z is an alkylene group, arylene group or cycloalkylene group or a divalent hydrocarbon group of 1 to 20 carbon atoms consisting of a combination of these groups; $n$ is 0 or 1; and Y is an aromatic hydrocarbon group, the two carbonyl groups being bonded to two adjacent carbon atoms of the aromatic hydrocarbon group or to two carbon atoms in peri-position to each other, and (B) (i) at least one repeating unit of the formula

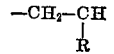

(B-i)

wherein R is a hydrogen atom, an alkyl group having not more than 4 carbon atoms, an alkyl carbonyloxy group having not more than 4 carbon atoms, or group —(Z)ₙ—OH, and Z and $n$ are as defined above,
(ii) a repeating unit of the formula

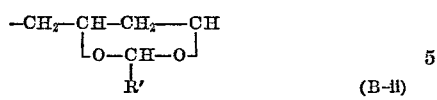

(B-ii)

wherein R' is a hydrogen atom or an alkyl group having not more than 4 carbon atoms, or
(iii) a combination of the repeating units (i) and (ii);
the amount of unit A being 0.001 to 30 mole percent of the total repeating units.

In the general Formula A, examples of group Z include straight-chain or branched-chain alkylene groups having 1 to 20 carbon atoms such as methylene, 1,2-ethylene, 1,2- or 1,3-propylene, butylene, or pentamethylene group, arylene groups having 6 to 20 carbon atoms such as 1,4-phenylene, 1,2-phenylene, 2-methyl-1,4-phenylene group or naphthalene, cycloalkylene groups having 6 to 20 carbon atoms such as 1,4-cyclohexylene, or divalent hydrocarbon groups consisting of a combination of these, such as an alkarylene group, for example,

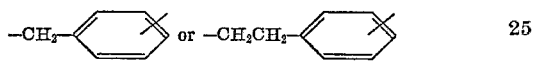

Aromatic hydrocarbon group Y may be directly bonded to the main chain of the polymer through the carbonyloxy group, or through group Z. Preferably, the aromatic hydrocarbon group is a benzene ring or naphthalene ring.

The repeating unit expressed by the general formula (B-i) may be at least one of the following units:

(a) —CH₂—CH₂— unit (B-i-a)
(b) a unit expressed by the formula

(B-i-b)

wherein R² is an alkyl group having not more than 4 carbon atoms, preferably methyl or ethyl,
(c) a unit expressed by the formula

(B-i-c)

wherein R³ is an alkyl group having not more than 3 carbon atoms, preferably methyl, and
(d) a unit expressed by the formula

(B-I-d)

In the unit (B-ii), R¹ is preferably a hydrogen atom, but may also be an alkyl group such as methyl or ethyl.

The unit (B-i) and the unit (B-ii) may be present in combination.

The copolymer of the present invention contains the unit of Formula A in an amount of 0.001 to 30 mole percent, preferably 0.01 to 3.0 mole percent, based on the total units, although this amount differs depending upon the use to which the copolymer is to be put. When the copolymer of the invention is used directly for shaped articles, it is preferred that the unit (A) should be contained in an amount of 0.001 to 3.0 mole percent. When the copolymer of the present invention is blended with a polyolefin in order to improve its properties such as dyeability, printability, or adhesiveness, the unit of Formula A should preferably be contained in an amount of 0.01 to 30 mole percent based on the total units.

The molecular weight of the copolymer of the invention is not particularly restricted, and is such that the polymer has film- or fiber-forming ability.

Especially useful copolymers of the invention are
(1) a copolymer composed of
0.001 to 20 mole percent of a unit of the formula

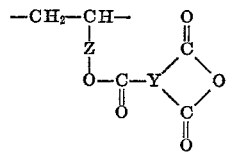

0 to 20 mole percent of a unit of the formula

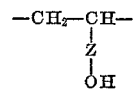

and the remainder being a polymerized propylene unit, and
(2) a copolymer composed of
0.001 to 30 mole percent of a unit of the formula

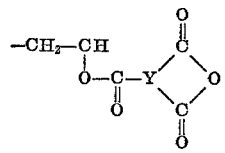

0 to 30 mole percent, preferably 0 to 10 mole percent, of a unit of the formula

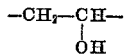

0 to 80 mole percent, preferably 0 to 50 mole percent, of a unit of the formula

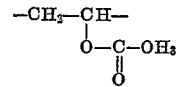

and the remainder being of a polymerized ethylene unit. Also useful is a copolymer composed of 0.001 to 30 mole percent of a unit of the formula

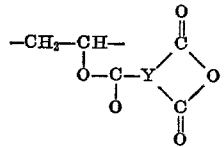

0 to 30 mole percent of a unit of the formula

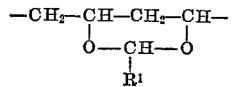

0 to 80 mole percent of a unit of the formula

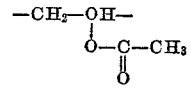

and the remainder being a polymerized vinyl alcohol unit.

The copolymer above mentioned of the present invention can be produced by reacting the corresponding hydroxyl-containing olefin polymer, polyvinyl alcohol or polyvinyl acetal with an aromatic compound containing an acid anhydride unit and an acid halide unit.

According to the present invention, a process is provided for producing modified olefin polymers, polyvinyl alcohol or polyvinyl acetal having bonded acid anhydride the invention can be readily performed by an ordinary method, for example, using blenders, mixers, kneaders, or rolls.

It has been further found that the polymers having an aromatic carboxylic acid anhydride unit has good compatibility with olefin polymers, and olefin polymer compositions comprising olefin polymers and the polymers containing an aromatic carboxylic anhydride unit have markedly improved dyeability, adhesiveness, and printability.

According to another aspect of the invention, an olefin polymer composition is provided comprising (1) an olefin polymer and (2) a modified polymer having an aromatic carboxylic acid anhydride unit bonded to the main chain of the hydrocarbon by an ester-linkage.

Examples of the olefin polymer (1) include homopolymers of alpha-olefins such as ethylene, propylene, 1-butene, or 4-methyl-1-pentene, and copolymers of alpha-olefins with each other, such as ethylene, propylene, or 1-butene. Crystalline polymers or copolymers are preferred.

Of course, these olefin polymers have sufficient molecular weight for fabrication into films or fibers.

The modified polymer having an aromatic carboxylic anhydride unit to be blended with the polyolefin may be those described above.

The composition comprising the olefin polymer and the modified polymer having an aromatic carboxylic anhydride unit is produced by an ordinary method using blenders, mixers, kneaders, rolls, etc. At this time, the composition may contain additives such as anti-oxidants, ultraviolet absorbents, slipping agents, or copper damage inhibitors, or pigments.

The amount of the modified polymer varies according to the amount of the acid anhydride unit bonded. It is however preferred that the amount of the acid anhydride unit in the composition be 0.001 to 3.0 mole percent.

The composition of the present invention is fabricated into sheets, films, fibers, or filaments by various means such as compression molding, injection molding, or extrusion molding. The fabricating conditions are the same as those for ordinary olefin polymers or olefin polymer compositions.

The olefin polymer composition of the invention may also be prepared by reacting a compound of the Formula D.

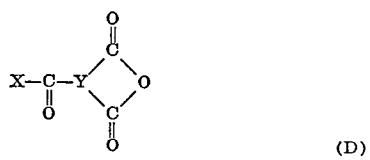

(D)

with a composition obtained by mixing an olefin polymer with an olefin polymer, polyvinyl alcohol or polyvinyl acetal having a repeating unit expressed by Formula C

(C)

or a shaped article fabricated from the resulting composition, whereby the olefin copolymer composition is formed in situ.

The composition of the present invention has high affinity for dyes, and exhibits especially good dyeability for basic dyes and cationic dyes. The dyeings obtained have excellent fastness to sunlight, washing, or drycleaning. The composition also possesses high affinity for adhesives and printing inks, and good antistatic properties.

The following examples will illustrate the present invention further.

EXAMPLE 1

A 2-liter glass polymerization vessel was charged with 800 ml. of kerosene, and thoroughly purged with nitrogen, followed by placing 0.06 mole of diethylaluminum chloride in the vessel. Then, 0.06 mole of 10-undecen-1-ol was added dropwise from a dropping funnel in the course of 10 minutes, and the reaction was performed for 30 minutes at 70° C. 4.0 g. of titanium trichloride (titanium trichloride AA, Stauffer Company) and propylene were introduced while maintaining the temperature at 70° C. Propylene was polymerized for 3 hours. After the termination of the polymerization, the catalyst was decomposed with a large excess of methanol, and repeatedly washed, followed by drying at reduced pressure for one day and night at 70° C. As a result, 390 g. of a copolymer of propylene and 10-undecen-1-ol were obtained. The content of 10-undecen-1-ol unit per gram of the copolymer was 0.09 millimole. The copolymer had an intrinsic viscosity of 4.15 measured at 135° C. in Decalin. The resultant copolymer was pelletized at 200° C., and melt-spun at 265° C. to form 5-denier filaments.

2.0 g. of these filaments were immersed in 200 ml. of benzene in which 10 g. of anhydrous trimellitic acid chloride and 1 ml. of pyridine were dissolved, and the reaction was performed for 5 hours at room temperature. The filaments were washed with acetone, and air dried. The dyeing test was performed on the resulting filaments in the following manner.

The filaments were dyed using a dye bath prepared by dissolving Maxilon Brilliant Scarlet 2G (trade name of a cationic dye, product of Geigy) in an aqueous solution of acetic acid (0.5 g./liter) and a nonionic surface active agent (2 g./liter) at 98° C. for one hour. The goods-to-liquor ratio was 1:50, and the concentration of the dye was 3%. The filaments were dyed in deep beautiful color with a dye exhaustion of 90%. The fastness of the dyeing to washing, drycleaning and sunlight proved very good.

On the other hand, when filaments of non-modified propylene/10-undecen-1-ol copolymer were dyed under the same conditions, the dye exhaustion was 15%. Filaments of propylene homopolymer were hardly dyed under the same conditions.

The dyeing test was conducted on filaments spun from a graft copolymer obtained by grafting 0.10 millimole/g. of maleic anhydride to a propylene homopolymer, but the dye exhaustion was only 4%.

EXAMPLE 2

A 500 ml. glass reaction vessel was charged with 200 ml. of refined benzene, 50 g. of the copolymer of propylene and 10-undecen-1-ol prepared in Example 1, 26.5 g. of anhydrous trimellitic acid chloride and 3.4 ml. of pyridine, and these compounds were heated under reflux for 4 hours with stirring. Using a mixer, the resulting mixture was washed repeatedly with acetone, and dried at reduced pressure to yield 50.7 g. of a white powdery product. The infrared absorption spectrum of this product indicated that the absorption at 3350 cm.$^{-1}$ of the propylene/10-undecen-1-ol copolymer (the hydroxyl group of the primary alcohol) disappeared, and the absorption at 1858 cm.$^{-1}$ and 1785 cm.$^{-1}$ (acid anhydride unit) and the absorption at 1731 cm.$^{-1}$ (ester unit) newly appeared strongly. Even when the product was extracted for 24 hours with boiling acetone which is a good solvent for anhydrous trimellitic acid chloride, the intensity of these new absorptions was not reduced at all. The content of the acid anhydride unit was quantitatively analyzed using an infrared absorption spectrum, and was found to be 0.08 millimole per gram of the product. The modified copolymer was pelletized at 200° C., and melt-spun at 260° C. to form 10-denier filaments.

The same dyeing test as mentioned in Example 1 was performed on the resulting filaments using Maxilon Brilunits, which comprises reacting an olefin polymer, polyvinyl alcohol or polyvinyl acetal having a recurring unit of the general formula

wherein Z is an alkylene, arylene or cycloalkylene group or a divalent hydrocarbon group of 1–20 carbon atoms consisting of a combination of these groups, and $n$ is zero or 1; with a compound of the following formula

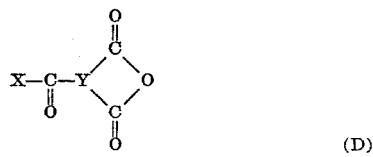

wherein X is a halogen atom, Y is an aromatic hydrocarbon group, preferably an aromatic hydrocarbon group having 6 to 12 carbon atoms, the two carbonyl groups being bonded to two adjacent carbon atoms of the aromatic hydrocarbon group or to two carbon atoms in peri-position to each other.

Polymer having a repeating unit of the Formula C is preferably a copolymer composed of (1) 0.001 to 60 mole percent, based on the total repeating units, of a unit expressed by general Formula C, (2) 0 to 80 mole percent based on the total repeating units, of a unit expressed by Formula B-i-c, and (3) the remainder being a unit selected from the group consisting of a unit expressed by general Formula B-i-a and B-i-b. Examples of such copolymer include copolymers of olefins with unsaturated alcohols such as vinyl alcohol, allyl alcohol, 3-buten-1-ol, 4-penten-1-ol, 5-hexan-1-ol, 6-heptene-1-ol, 7-octen-1-ol, 10-undecen-1-ol, 2-methyl-3-buten-1-ol, 5-hexen-2-ol, 2-allylphenol, 4-butenylphenol, 2-phenyl-4-penten-1-ol, 4-vinylphenol, or 4-vinylcyclohexanol, and partially hydrolyzed copolymers of olefins with vinyl esters of carboxylic acids.

A coordination catalyst including the so-called Ziegler-type catalysts is preferably used for the copolymerization of olefins with unsaturated alcohols. One example of preparing copolymers using a coordination catalyst is a method of copolymerizing olefins with metal derivatives of unsaturated alcohols in the presence of a coordination catalyst.

It is known to copolymerize olefins, especially ethylene, with unsaturated alcohols by a radical catalyst, but olefins other than ethylene do not give crystalline high-molecular-weight copolymers. From this viewpoint also, it is preferred that the copolymerization of olefins other than ethylene, for example propylene should be performed using a coordination catalyst known per se.

The hydroxyl-containing olefin polymers can also be produced by reducing copolymers of olefins and unsaturated esters, unsaturated aldehydes or unsaturated ketones with hydrogen. They can also be produced by hydrolyzing copolymers of olefins with esters of unsaturated alcohols. For example, U.S. Pat. 2,386,347 discloses that a copolymer of ethylene and vinyl alcohol is prepared by hydrolyzing a radical copolymer of ethylene and vinyl acetate. In this process, the content of the hydroxyl group can be varied according to the content of vinyl acetate and the degree of saponification.

Of these copolymers of olefins with unsaturated alcohols, copolymers of propylene with unsaturated alcohols are preferably those which have an intrinsic viscosity measured at 135° C. in Tetralin of 1.0 to 5.0. Copolymers of ethylene and vinyl acetate are preferably those having an intrinsic viscosity measured at 75° C. in xylene of 0.1 to 3.0.

Polyvinyl alcohol that can be used is a partially or completely saponified product of poly(vinyl acetate).

Polyvinyl acetal that can be used is a product obtained by acetalizing polyvinyl alcohol with an aldehyde such as formaldehyde, acetaldehyde, or by butyladehyde.

The polyvinyl alcohol or polyvinyl acetal used in the invention generally a molecular weight of 5000 to 40,000.

As the compound expressed by general Formula D, acid halides containing an aromatic carboxylic anhydride unit we may cite. Specific examples are acid halides of aromatic carboxylic anhydrides such as trimellitic anhydride, hemimellitic anhydride, naphthalene-1, 2,5-tricarboxylic acid - 1,2 - anhdride, naphthalene-1,3,8-tricarboxylic acid-1,8-anhydride, or naphthalene-1,4,5-tricarboxylic acid-4,5-anhydride. Especially preferred are acid halides of trimellitic anhydride. The acid halides are, for example, acid chlorides and acid bromides, the acid chlorides being preferred.

When a compound of Formula D is reacted with a compound of Formula C, an acid anhydride unit is bonded to the polymer by a condensation reaction in which a hydrogen halide is removed from the acid halide and the hydroxyl group.

The reaction of a compound of Formula II with a hydroxyl-containing olefin polymer, polyvinyl alcohol or polyvinyl acetal is performed in the presence or absence of a diluent and/or an acid binder at a temperature of −30 to 300° C. at a pressure below atmospheric pressure up to 50 atmospheres for a period of several seconds to about an hour. The preferred temperatures are 0 to 100° C., and the preferred pressures are 1 to 10 atmospheres.

Examples of the diluent which are usually used are hexane, heptane, kerosene, benzene, toluene, xylene, dimethyl formamide, or dimethyl sulfoxide.

It is preferred that the reaction is generally performed in the presence of an acid binder. Preferred acid binders include tertiary amines such as triethylamine, tributylamine, N,N-dimethylaniline, pyridine, morpholine, or quinoline.

Because of the aromatic acid anhydride unit, the novel modified polymer of the present invention exhibits various characteristics which are not expected from homopolymers of olefins, hydroxyl-containing olefin polymers, polyvinyl alcohol or polyvinyl acetal. Fibers or films produced from the modified copolymers of the present invention can be readily dyed with known dyes, and especially have good affinity for basic dyes and cationic dyes. The dyeings obtained have excellent fastness to sunlight, washing, or dry-cleaning. Furthermore, the modified copolymers of the invention can be easily bonded by various bonding agents. Also, they have good printability when printing is effected with dyes or inks. Polyolefins are insulators and develop static charge on friction; therefore, their use has been limited. This defect has been greatly eliminated by the modified copolymer of the present invention, and no great static charge occurs on the modified copolymers of the present invention.

If desired, the modified copolymers of the present invention can be converted to amides or imides by reaction of the acid anhydride unit with, for example, ammonia or amines.

Since the acid anhydride group is bonded to the aromatic ring in the polymer of the present invention, the polymer is relatively stable at high temperatures. Therefore, articles of the polymer fabricated by such means as melt-extrusion exhibit excellent dyeability, adhesiveness, printability, and other properties just as the polymers before melt-shaping.

The polymer of the invention can be shaped into such articles as fibers, films, filaments or sheets. At this time, the polymer may contain an additive such as anti-oxidants, ultraviolet absorbents, slipping agents, or copper damage inhibitors, or ordinary pigments. These additives can be very well dispersed because of the presence of the strongly polar group, i.e., acid anhydride unit. The blending of stabilizers, additives, etc. with the modified polymer of liant Scarlet 2G and Maxilon Red BL (C.I. Basic Red 22, trade name, Geigy). The filaments were dyed in deep vivid color. The dye exhaustion was 95% and 87%, respectively.

When the pellets of the resulting copolymer were interposed between 0.1 mm.-thick aluminum plates, and compression molded at 220° C., a laminate plate was formed. Wtihout using an adhesive, the adhesion between the aluminum plate and the modified copolymer was very good.

On the other hand, an aluminum plate was not at all bonded to a propylene homopolymer.

EXAMPLE 3

A 5-liter glass reaction vessel was charged with one liter of benzene, one liter of a 10% aqueous solution of potassium hydroxide and 50 g. of commercially available ethylene/vinyl acetate copolymer (the vinyl acetate content of 0.17 millimole per gram of the copolymer), and heated under reflux for 3 hours, followed by steam distillation. As a result 33.5 g. of a saponified product of an ethylene/vinyl acetate copolymer having 0.14 millimole of a hydroxyl group per gram of the copolymer were obtained. The saponified product had an intrinsic viscosity of 2.15 as measured at 75° C. in xylene. This saponified product was pelletized at 180° C., and melt-spun at 200° C. to form 10-denier filaments.

The filaments were treated with anhydrous trimellitic acid chloride in the same way as set forth in Example 2, and the dyeing test was performed in the same way as set forth in Example 1 using Maxilon Brilliant Green 3G. The filaments were dyed deep and vivid, and the dye exhaustion was 87%. The dyeing had excellent fastness to washing, dry cleaning and sunlight.

When the dyeing test was conducted under the same conditions on filaments which had not been treated with anhydrous trimellitic acid chloride, the dye exhaustion was 5%.

EXAMPLE 4

A 2-liter glass reaction vessel was charged with one liter of kerosene and 570 millimoles of diethylaluminum chloride, and 650 millimoles of titanium tetrachloride were added dropwise at a temperature below room temperature over a period of 30 minutes. The temperature was raised to 40° C., and the reaction was performed for 3 hours. The resulting precipitate was separated by decantation, and washed several times with kerosene. The resulting suspension was heated for 2 hours at 140° C. The concentration of trivalent titanium was 0.864 mole/liter as a result of titration.

A 500 ml. glass polymerization vessel was charged with 250 ml. of kerosene, 10 millimoles of the above prepared catalyst component, and 50 millimoles of

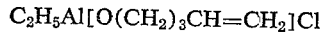
$C_2H_5Al[O(CH_2)_3CH=CH_2]Cl$

The temperature was raised to 70° C., and propylene was polymerized at 70° C. for 40 minutes. The catalyst was decomposed with a mixture of methanol and hydrochloric acid, and the product was repeatedly washed to yield 65 g. of a copolymer of propylene and 4-penten-1-ol which had an intrinsic viscosity of 3.72 as measured at 135° C. in Decalin.

Fifty grams of this copolymer were suspended in 200 ml. of xylene containing 10 millimoles of pyridine, and reacted with 10 millimoles of naphthalene-1,4,5-tricarboxylic acid-4,5-anhydride chloride at 70° C. for 4 hours to yield 49.7 g. of powders containing 0.07 millimole per gram of the copolymer of an acid anhydride unit. From the resulting powders, filaments of 7 denier were prepared in the same way as set forth in Example 2. When the dyeing test was conducted on the filaments, they were dyed with good results.

EXAMPLE 5

A 500-ml. glass polymerization vessel was charged with 250 ml. of kerosene, 10 millimoles of titanium trichloride (titanium trichloride AA, Stauffer Company), and 50 millimoles of $C_2H_5Al[OCH_2CH(CH_3)CH=CH_2]Cl$, and then the temperature was raised to 70° C. Propylene was polymerized for 40 minutes at 70° C. The catalyst was decomposed with a mixture of methanol and hydrochloric acid, and the product was repeatedly washed to yield 17 g. of a copolymer of propylene and 2-methyl-3-buten-1-ol. The hydroxyl group content was 0.08 millimol per gram of the copolymer. The copolymer had an intrinsic viscosity of 3.97 measured at 135° C. in Decalin.

A 0.01 mm.-thick film was prepared at 250° C. from the resultant powdery copolymer. One gram of the film was suspended in 200 ml. of hexane containing 8 millimoles of triethylamine, and reacted with 80 millimoles of anhydrous trimellitic acid bromide by heating under reflux for 4 hours. When the same dyeing test as set forth in Example 1 was performed on the film obtained, the film was dyed with good results.

EXAMPLE 6

One gram of 5-denier filaments of polyvinyl acetal (degree of formalization 20 mole percent) was immersed in 300 ml. of a benzene solution containing 30 g. of anhydrous trimellitic acid chloride and 1 ml. of pyridine, and the reaction was performed at 60° C. for 2 hours. Modified filaments were obtained in which 0.17 millimole of the acid anhydride unit was present per gram of the filaments.

The modified filaments obtained were dyed in the same way as set forth in Example 1 using Maxilon Blue GRL (C.I. Basic Blue 41, trade name, Geigy), and were colored deep and vivid. The dye exhaustion was 87%.

EXAMPLE 7

A copolymer of propylene and 10-undecen-1-ol obtained using titanium trichloride and diethylaluminum chloride as catalysts was reacted with anhydrous trimellitic acid chloride. The content of the acid anhydride unit was quantitatively analyzed by infrared absorption spectrum, and found to be 0.74 millimole per gram of the modified copolymer obtained.

The modified copolymer was blended with the powders of propylene homopolymer having an intrinsic viscosity of 2.1 to form a composition containing the acid anhydride unit in an amount of 0.1 millimole per gram of the composition. The composition was pelletized at 200° C., and melt-spun at 260° C. to form 5-denier filaments.

The filaments obtained were dyed in the same way as set forth in Example 1. The dye exhaustion was 90%, and the filaments were dyed deep and vivid. The dyeing had excellent fastness to sunlight, drycleaning and washing.

The same dyeing test was performed on filaments prepared from a propylene homopolymer.

When the pellets of the composition were interposed between 0.1 mm. thick aluminum plates, and compression molded at 220° C. to form a laminate plate, without using an adhesive, the adhesion between the aluminum plates and the composition was very good.

On the other hand, the propylene homopolymer was not at all bonded to the aluminum plate.

EXAMPLE 8

Ten grams of the propylene/10-undecen-1-ol copolymer obtained in Example 7, were blended with 70 g. of the powders of propylene homopolymer having an intrinsic viscosity of 2.3. The resulting composition was pelletized at 200° C., and then melt-spun at 260° C. to form 5 denier filaments. 2.0 g. of the filaments were immersed in 200 ml. of a benzene solution containing 10 g. of anhyrous trimellitic acid chloride and 1 ml. of pyridine, and the reaction was performed for 4 hours at the boiling point. The filaments were washed with acetone, and air dried. The infrared absorption spectrum of the filaments indicated the same absorption characteristics as in Example 7.

In the same way as set forth in Example 1, the filaments obtained were dyed using Maxilon Brilliant Scarlet 2G and Maxilon Brilliant Green 3G. They were dyed deep and vivid, and the dye exhaustion was 80% and 85% respectively. These dyeings had excellent fastness to washing, drycleaning, and sunlight.

When the same dyeing test was performed on filaments not treated with anhydrous trimellitic acid chloride, the dye exhaustion was 70% and 15% respectively, and the fastness to drying was poor.

Filaments of crystalline propylene homopolymer were treated with anhydrous trimellitic acid chloride in the same way, and were dyed under the same conditions as mentioned above. The filaments were hardly dyed by any of these dyes.

EXAMPLE 9

Commercially available copolymer of ethylene and vinyl acetate (vinyl acetate content 3.54 millimoles per gram of the copolymer) was reacted with an aqueous solution of potassium hydroxide to form a saponified product of the copolymer having 3.96 millimoles per gram of the copolymer of hydroxyl groups.

10 g. of the saponified product were blended with 240 g. of propylene homopolymer having an intrinsic viscosity of 2.10, and 5 denier filaments were prepared from the resulting composition in the same way as set forth in Example 8. The filaments were treated with anhydrous trimellitic acid chloride in the same way as set forth in Example 8. The dyeing test was conducted in the same way as set forth in Example 1. When Maxilon Brilliant Scarlet 2G was used, the dye exhaustion of the filaments was 87%. When the dyeing was immersed in trichloroethylene, it was not at all decolored.

EXAMPLE 10

Propylene was polymerized using a hydrocarbon-insoluble reaction product of titanium tetrachloride and diethylaluminum chloride and $$C_2H_5Al[O(CH_2)_3CH=CH_2]Cl$$

as a catalyst to form a propylene/4-penten-1-ol copolymer containing 0.20 millimole of 4-pentene-1-ol per gram of the copolymer.

50 g. of the copolymer were suspended in 200 ml. of xylene, and reacted with 100 millimoles of naphthalene-1,4,5-tricarboxylic acid-4,5-anhydride chloride and 10 millimoles of pyridine at 70° C. for 4 hours. As a result 49.7 g. of a powdery product which had 0.14 millimole of the acid anhydride unit per gram of the product were obtained.

200 g. of the modified copolymer was blended with 1700 g. of ethylene homopolymer (Hizex 5000 F., registered trademark, Mitsui Petrochemical Industries). The resulting composition was pelletized at 190° C., and a 0.02 mm. thick film was prepared by extrusion molding from the composition at 220° C.

The film was dyed under the same conditions as set forth in Example 1. An excellently dyed film was obtained.

EXAMPLE 11

20 g. of the modified copolymer (acid anhydride unit content 0.74 millimole/g.) obtained in Example 7 were blended with 100 g. of an ethylene/propylene copolymer (having an intrinsic viscosity of 2.43 and an ethylene content of 5 mole percent). The composition obtained was pelletized at 200° C. and a 0.02 mm.-thick film was extruded at 210° C.

When the film was dyed under the same conditions as set forth in Example 1, an excellently dyed film was obtained.

EXAMPLE 12

5 g. of polyvinyl alcohol (degree of formalization 20 mole percent) were blended with 100 g. of polyethylene (Hizex 5000 S, registered trademark, Mitsui Petrochemical Industries). The resulting composition was pelletized at 190° C., and melt-spun at 220° C. to form 15 denier filaments.

The filaments obtained were treated with anhydrous trimellitic acid chloride in the same way as set forth in Example 8, and then dyed with Maxilon Blue GRL (trademark, Geigy). The filaments could be dyed vivid and deep, and the dye exhaustion was 87%.

EXAMPLE 13

10 g. of an ethylene/vinyl acetate/vinyl alcohol ternary copolymer (ethylene content 70.6%, vinyl acetate content 23.7%, and vinyl alcohol content 5.7%) were reacted with 10 g. of anhydrous trimellitic acid chloride to form a modified copolymer having an acid anhydride unit content of 1.1 millimoles per gram of the copolymer.

10 g. of the modified copolymer were blended with 100 g. of propylene homopolymer having an intrinsic viscosity of 2.10. The composition obtained was formed into filaments, and the same dyeing test as set forth in Example 1 was performed. The dyeing results were good.

What we claim is:

1. A fiber and film forming copolymer composed of:
(A) a repeating unit of the formula

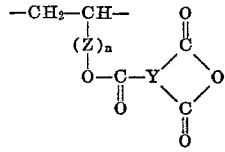

wherein Z is an alkylene group, arylene group or a cycloalkylene group or a divalent hydrocarbon group of 1 to 20 carbon atoms consisting of a combination of these groups; $n$ is 0 or 1; and Y is an aromatic hydrocarbon group, the two carbonyl groups being bonded to two adjacent carbon atoms of the aromatic hydrocarbon group or to two carbon atoms in peri-position to each other, and (B) (i) at least one repeating unit of the formula

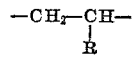

wherein R is a hydrogen atom, an alkyl group having not more than 4 carbon atoms, an alkyl carbonyloxy group having not more than 4 carbon atoms, or group —$(Z)_n$—OH, and Z and $n$ are as defined above, (ii) repeating unit of the formula

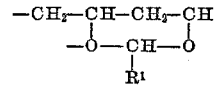

wherein R' is a hydrogen atom or an alkyl group having not more than 4 carbon atoms, or (iii) a combination of the repeating units (i) and (ii); the amount of said unit A being 0.001 to 30 mole percent of the total repeating units.

2. The copolymer of claim 1 composed of (1) 0.001 to 30 mole percent of a unit of the formula

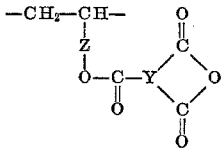

(2) 0 to 20 mole percent of a unit of the formula

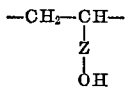

and (3) the remainder being a polymerized propylene unit.

3. The copolymer of claim 1 composed of
(1) 0.001 to 30 mole percent, of a unit of the formula

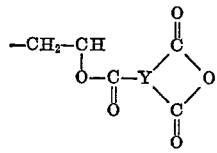

(2) 0 to 30 mole percent of a unit of the formula

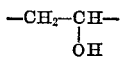

(3) 0 to 80 mole percent of a unit of the formula

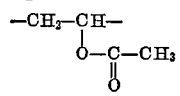

and
(4) the remainder being a polymerized ethylene unit.

4. The copolymer of claim 1 composed of
(1) 0.001 to 30 mole percent of a unit of the formula

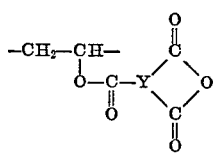

(2) 0 to 30 mole percent of a unit of the formula

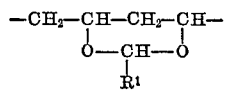

(3) 0 to 80 mole percent of a unit of the formula

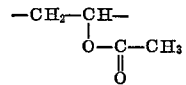

and
(4) the remainder being a polymerized vinyl alcohol unit.

5. A shaped structure composed of the copolymer of claim 1.

6. Fibers composed of the copolymer of claim 1.

7. A process for producing a modified olefin polymer, polyvinyl alcohol or polyvinyl acetal having bonded acid anhydride units, which comprises reacting an olefin polymer, polyvinyl alcohol or polyvinyl acetal having a recurring unit of the general formula

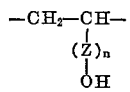

(C)

wherein Z is an alkylene, arylene or cycloalkylene group or a divalent hydrocarbon group of 1–20 carbon atoms consisting of a combination of these groups, and $n$ is zero or 1; with a compound of the following formula

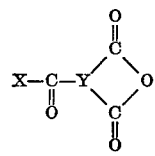

(D)

wherein X is a halogen atom and Y is an aromatic hydrocarbon group, the two carbonyl groups being bonded to two adjacent carbon atoms of the aromatic hydrocarbon group or to two carbon atoms in a peri-position to each other.

8. The copolymer of claim 1 wherein group Y is selected from the group consisting of a benzene ring and a naphthalene ring; and Z is selected from the group consisting of an alkylene group having 1 to 20 carbon atoms, an arylene group having 6 to 20 carbons, a cycloalkylene group having 6 to 20 carbon atoms and a divalent hydrocarbon group of 1 to 20 carbon atoms consisting of a combination of these groups.

9. The copolymer of claim 2 wherein group Y is selected from the group consisting of a benzene ring and a naphthalene ring; and Z is selected from the group consisting of an alkylene group having 1 to 20 carbon atoms, an arylene group having 6 to 20 carbons, a cycloalkylene group having 6 to 20 carbon atoms and a divalent hydrocarbon group of 1 to 20 carbon atoms consisting of a combination of these groups.

10. The copolymer of claim 3 wherein group Y is selected from the group consisting of a benzene ring and a naphthalene ring.

11. The copolymer of claim 4 wherein group Y is selected from the group consisting of a benzene ring and a naphthalene ring.

12. The process of claim 7 wherein group Y is selected from the group consisting of a benzene ring and a naphthalene ring; and Z is selected from the group consisting of an alkylene group having 1 to 20 carbon atoms, an arylene group having 6 to 20 carbons, a cycloalkylene group having 6 to 20 carbon atoms and a divalent hydrocarbon group of 1 to 20 carbon atoms consisting of a combination of these groups.

13. The copolymer of claim 1 composed of
(1) 0.001 to 30 mole percent of a unit of the formula

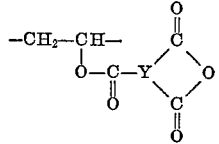

(2) 0 to 10 mole percent of a unit of the formula

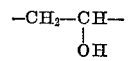

(3) 0 to 50 mole percent of a unit of the formula

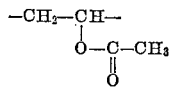

and
(4) the remainder being a polymerized ethylene unit.

14. The copolymer of claim 13 wherein group Y is selected from the group consisting of a benzene ring and a naphthalene ring.

15. The copolymer of claim 1 composed of
(1) 0.001 to 30 mole percent of a unit of the formula

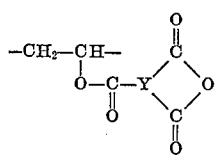

(2) 0 to 10 mole percent of a unit of the formula

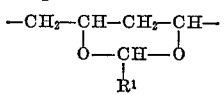

(3) 0 to 50 mole percent of a unit of the formula
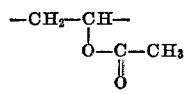
and
(4) the remainder bieng a polymerized vinyl alcohol unit.
16. The copolymer of claim 15 wherein group Y is selected from the group consisting of a benzene ring and a naphthalene ring.
References Cited
UNITED STATES PATENTS
3,548,408  12/1970  Worrall _____ 260—87.3
3,321,429   5/1967  Thörmer et al. _____ 260—29.4
JOSEPH L. SCHOFER, Primary Examiner
J. KIGHT, III, Assistant Examiner
U.S. Cl. X.R.
260—87.3, 91.3 VA, 897 R